United States Patent [19]

Jones

[11] 4,280,666
[45] Jul. 28, 1981

[54] HAND HELD GRANULATOR

[76] Inventor: Robert H. Jones, 4107 Riverside Dr., Apt C, Coral Springs, Fla. 33065

[21] Appl. No.: 93,545

[22] Filed: Nov. 13, 1979

[51] Int. Cl.³ .................................................. A47J 42/14
[52] U.S. Cl. ..................................... 241/169.1; 241/100; 241/273.2
[58] Field of Search ................... 241/168, 169.1, 273.2, 241/100, 101 R, 89.2; D7/53

[56] References Cited

U.S. PATENT DOCUMENTS

| D. 255,861 | 7/1980 | Hsu | D7/53 |
| 944,241 | 12/1909 | Jordan | 241/273.2 X |
| 3,642,045 | 2/1972 | Buvelot | 241/169.1 |
| 3,827,691 | 8/1974 | Andersson | 241/101 R |
| 3,991,947 | 11/1976 | Schlessel | D41/169.1 X |
| 4,082,230 | 4/1978 | Bounds | 241/169.1 X |
| 4,212,430 | 7/1980 | Dale et al. | 241/169.1 X |

Primary Examiner—Eugene F. Desmond
Attorney, Agent, or Firm—Joseph A. Edminister

[57] ABSTRACT

A hand held granulator for peppercorns, salt, nuts, spices, foliage greens and the like with storage of unground and ground material. A first cylindrical container portion with removable cap stores unground material and a second cylindrical container portion stores ground material. Two sealingly engaged central flanges with an interchangeable grinding screen therebetween receive the first and second containers on either side with the first in sliding rotational engagement and the second in fixed engagement. A twisting motion imparted by the hands results in grinding of the materials between the first container portion and the screen. Ground material passes through the grinding screen and is either retained in the second cylindrical container or dropped free.

10 Claims, 2 Drawing Figures

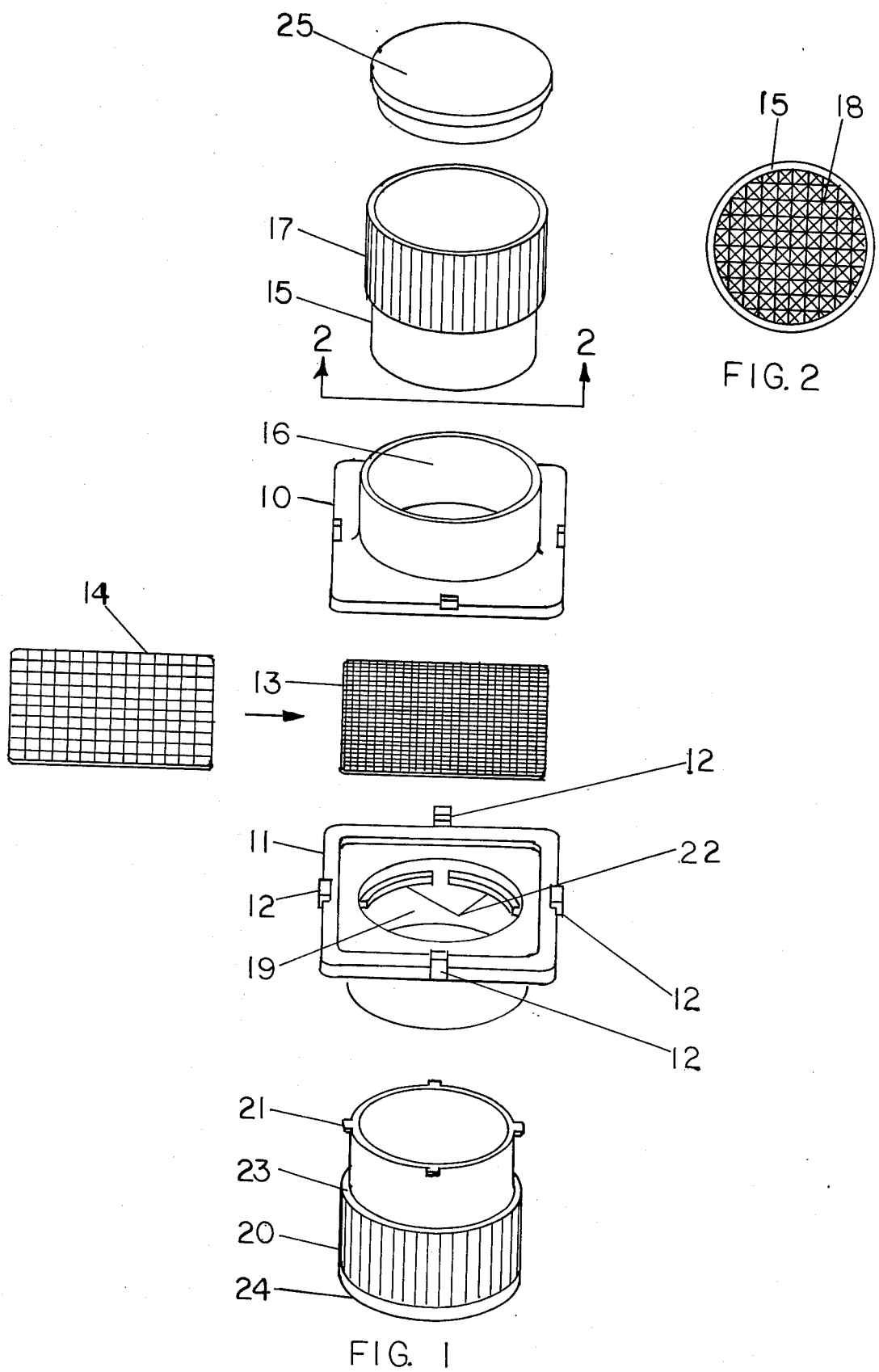

HAND HELD GRANULATOR

BACKGROUND OF THE INVENTION

The present invention relates to hand held grinding devices and the like. More specifically the invention relates to a grinder for peppercorns, coarse salt, spices, foliage greens and similar condiments in which grinding is achieved by a relative rotational motion of the parts caused by a twisting motion of the hands.

The desirability of freshly ground spices and other condiments is well known both for seasoning main dishes of meats, vegetables and salads and also for adding seasoning to an individual serving to suit the taste. Grinders for salt and peppercorns are in wide use. Such grinders are designed for and serve a single purpose. The improved flavor of freshly ground spices and the accompanying aroma which results during grinding make it desirable to have a simple grinder in the food preparation area or at the table which can be adapted to grind a wide variety of condiments to coarse or fine consistency.

Many granulators and milling devices are known in the prior art. Several such devices known to the applicant are disclosed in the following U.S. Pat. Nos:

| | |
|---|---|
| 4,082,230 | Bounds |
| 3,991,947 | Schlessel |
| 3,827,641 | Andersson |
| 3,642,045 | Buvelot |
| 2,602,596 | Jones |
| 659,822 | Moore |
| 247,503 | Laha |

A thorough investigation of the prior art reveals devices for grinding which are held in the hands and grind a material with a twisting motion. Some have a large number of moving parts of hardened steel or special plastics with sharp cutting edges and driving gears to transmit the twisting motion of the body to the central cutting edges. Such devices are costly to manufacture and create a problem for the user when cutting edges become dull or gears wear so that the teeth slip. Replacement of parts is generally not possible and the entire device must be discarded. Some grinders provide a container for the unground condiment but give the operator no choice but to let the ground material drop free from the device. Other grinders which do include a container to hold the ground material fail to include the option of having the ground material fall free. No hand held grinders have been found in the prior art which offer the user a choice of grinding from coarse to fine or grinding a wide variety of condiments with the same device by interchangeable grinding screens where each screen is specifically suited to a particular condiment and which consist of a very few molded parts which can be disassembled readily for cleaning, easily manufactured at a low cost.

SUMMARY OF THE INVENTION

It is, therefore, an object of the present invention to provide a hand held granulator for salt, peppercorns, nuts, spices, foliage greens and the like.

It is another object of the present invention to provide a hand held granulator with interchangeable grinding screens.

It is a further object of the present invention to provide a hand held granulator with two cylindrical container portions one for storage of unground and the other for storage of ground condiments wherein the container for the ground material may be removed permitting the freshly ground material to fall free from the device.

It is still another object of the present invention to provide a hand held granulator which combines all of the above objects in a simple device of only a few molded parts easily disassembled for cleaning.

It is a further object of the present invention to provide a hand held granulator which combines all of the above objects and which is easily manufactured at a low cost.

These and other objects of the present invention, together with the advantages thereof over the existing prior art which will become apparant from the specification, are accomplished by the improvements hereinafter described and claimed.

BRIEF DESCRIPTION OF THE DRAWINGS

FIG. 1 is an exploded view of the hand held granulator showing all the parts and two of the interchangeable grinding screens.

FIG. 2 is a sectional view of the first tubular container taken in the direction shown along line 2—2 in FIG. 1.

DESCRIPTION OF THE PREFERRED EMBODIMENT

The hand held granulator shown in an exploded view in FIG. 1 in the preferred embodiment comprises a first central flange 10 with one generally planar surface for sealing engagement with a complementary planar surface of a second central flange 11 such that the two planar surfaces when locked together by fastening devices 12 are in sealing contact along their outermost edges while forming a shaped chamber there between to receive and hold a first removable shaped grinding screen 13 with a fine mesh or, alternatively, a shaped grinding screen 14 of a mesh different from screen 13. The first central flange 10 has a tubular shaped chamber 16 on the side away from the planar surface to receive in sliding rotational contact a first cylindrical container 17. The first cylindrical container 17 has one diameter at its end which slidingly engages in chamber 16 and another greater diameter at its end away from the first central flange 10 such that a ridge 15 is formed between the two different diameter portions. Ridge 15 locates the point where the diameter changes such that the portion engaged in chamber 16 extends within chamber 16 a proper distance to maintain good sliding engagement without extending in so far as to make contact with screens 13 or 14. The smaller diameter end of container 17 has a closing bottom 18 wherein the inner surface is smooth and the outer surface scored, etched and having protruding ridges to hold the condiments against the screen 13 and to force them to slide across the screen 13 in a grinding engagement therewith. The first cylindrical container 17 has a planar removable cap 25 thereby resulting in a cylindrical container which is closed at both ends when the cap 25 is in place. The second central flange 11 has one generally planar surface for sealing engagement along the outer most edges with the planar surface of central flange 10. Fastening devices 12 extended from the planar surface of flange 11 and lock within flange 10, holding the two central flanges in sealing engagement with a screen there between. A tubular shaped chamber 19 on the side of flange 11 away from the planar surface is of a size to receive a second cylindrical container secontainer 20 having a plurality of lock tabs 21 which pass between the segmented ridge 22 on the inner surface of tubular chamber 19 as the container is inserted, and after having passed ridge 22 perform a locking function as container 20 is turned a part of one revolution. Cylindrial container 20 has one diameter at the end which is inserted within chamber 19 and a second greater diameter at its other end, the two different diameters forming a ridge 23 which takes a position in proximity to the outermost edge of chamber 19 when the container 20 is in the locked position thereby forming a generally smooth outer cylindrical surface below the central flanges 10 and 11. The lower end of container 20 is closed by a smooth planar disc 24 thereby forming a cylindrical container open at one end and closed at the other.

In the operation of the hand held granulator unground materials are stored in the first cylindrical container 17 with cap 25 in place. A proper mesh screen for the material to be ground, 13 or 14, is inserted in the shaped chamber between the first and second central flanges, 10 and 11, which are then sealed together with fastening devices 12. The first cylindrical container 17 is removed from the chamber 16, the cap 25 removed and a quantity of the material to be ground deposited on the screen 13. The cap 25 is replaced and container 17 is reinserted in chamber 16, where upon the material is held against the screen by the container bottom 18. As a twisting motion is imparted to the first container 17 with respect to the central flanges 10 and 11 the materials are moved across the screen which grinds some of the materials with each partial rotation and the ground material passes through the screen 13 and is captured in container 20. In a second method of operation container 20 is removed from chamber 19 and the ground condiment falls free of the granulator and is deposited wherever the operator wishes. Therefore, in the first method a substantial quantity of material may be ground and stored in the second container 20 for later use as needed. In the second method no storage takes place and the granulator may be used with a fine screen 13 for one particular condiment and, shortly thereafter, a screen 14 having a different mesh may replace screen 13 and a different condiment ground and deposited wherever the operator may wish.

The hand held granulator illustrated and described in detail in this specification, in accordance with the Patent Statutes, is the preferred embodiment. It is to be understood that the invention is not limited thereto, since it will be apparent to those skilled in the art that a number of modifications, alternatives and other variations are possible. Accordingly, the invention should be considered to include all variations and alterations falling within the scope of the appended claims.

What I claim is:

1. A hand-held hand-operated granulator for grinding condiments such as peppercorns and foliage greens which comprises:
    a. a first central flange having one generally planar surface and opposite thereto a tubular chamber,
    b. a second central flange having one generally planar surface complementary to said planar surface of the first central flange having fastening means to sealingly engage said central flanges about their outermost edges forming a shaped chamber therebetween and having a tubular chamber opposite to the planar surface,
    c. a grinding screen for placement in said shaped chamber formed by said central flanges,
    d. a first cylindrical container for sliding circular movement within the tubular chamber of the first central flange,
    e. a bottom for the first container having means to grip said condiments and hold them against the grinding screen such that grinding takes place when said first cylindrical container is twisted by the hands with respect to the central flanges,
    f. a cap removably attached to the first cylindrical container,
    g. a second cylindrical container having one closed end and locking means at the opposite open end for locked insertion in the tubular chamber of the second central flange.

2. The granulator as recited in claim 1 wherein the grinding screen is square in shape.

3. The granulator as recited in claim 1 wherein the grinding screen is removable for replacement by an alternate grinding screen having a different mesh.

4. The granulator as recited in claim 1 wherein the second cylindrical container is removable to permit grinding of condiment when the first cylindrical container is rotated with respect to the central flanges and to allow the ground material to fall free to be deposited on whatever objects are beneath the granulator.

5. The granulator as recited in claim 1 wherein the second cylindrical container in the locked position within said second tubular chamber receives, contains and stores ground materials.

6. The granulator as recited in claim 1 wherein the first cylindrical container and the cap form a closed container to store unground materials.

7. The granulator as recited in claim 1 wherein the first and second cylindrical containers have outer surface irregularities for the purpose of improving the grip to permit easy relative rotational motion between the first container and the central flanges.

8. The granulator as recited in claim 7 wherein the surface irregularities are axial grooves spaced about the outer cylindrical surfaces of the first and second containers.

9. The granulator as recited in claim 1 wherein the central flanges and the first and second cylindrical containers and the cap are molded from plastic materials.

10. The granulator as recited in claim 9 wherein the grinding screen is molded from plastic materials.

* * * * *